US011985459B2

(12) United States Patent
Nguyen et al.

(10) Patent No.: US 11,985,459 B2
(45) Date of Patent: May 14, 2024

(54) MOUNTING SYSTEM FOR A LOUDSPEAKER

(71) Applicant: HARMAN INTERNATIONAL INDUSTRIES, INCORPORATED, Stamford, CT (US)

(72) Inventors: An Duc Nguyen, West Hills, CA (US); Christian Manuel Garcia, Winnetka, CA (US); Larry Paul Brown, Altadena, CA (US); Chris N. Hagen, Simi Valley, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 257 days.

(21) Appl. No.: 17/629,814

(22) PCT Filed: Jul. 29, 2020

(86) PCT No.: PCT/US2020/043953

§ 371 (c)(1),
(2) Date: Jan. 25, 2022

(87) PCT Pub. No.: WO2021/021853

PCT Pub. Date: Feb. 4, 2021

(65) Prior Publication Data

US 2022/0264205 A1 Aug. 18, 2022

Related U.S. Application Data

(60) Provisional application No. 62/879,743, filed on Jul. 29, 2019.

(51) Int. Cl.
*H04R 1/02* (2006.01)

(52) U.S. Cl.
CPC ....... *H04R 1/025* (2013.01); *H04R 2201/021* (2013.01)

(58) Field of Classification Search
CPC .............. H04R 1/025; H04R 2201/021; H04R 2201/029; H04R 1/026; H04R 2400/11;
(Continued)

(56) References Cited

U.S. PATENT DOCUMENTS 2,061,634 A 11/1936 Pleister
9,913,013 B1 3/2018 Sontoro
(Continued)

OTHER PUBLICATIONS

International Preliminary Report on Patentability for Application No. PCT/US2020/043953, dated Feb. 1, 2022, 10 pages.
(Continued)

*Primary Examiner* — Angelica M McKinney
(74) *Attorney, Agent, or Firm* — Brooks Kushman P.C.

(57) ABSTRACT

A mounting system for mounting a loudspeaker to a substrate includes a mounting assembly having an elongated screw, a support member received on and movable along the screw, and a mounting arm rotatably connected to the support member and having a resting position and a working position. A guide housing receives the mounting assembly with the screw extending longitudinally therethrough and includes a wall structure with an open front side and a cap at a top portion of the wall structure. In the resting position, the support member is positioned along the screw at least partially received within the cap and the mounting arm is substantially contained within the wall structure. In the working position, the support member is positioned along the screw to be outside of the cap and the mounting arm is spring-biased away from the screw and extends outwardly through the front side of the wall structure.

20 Claims, 6 Drawing Sheets

(58) Field of Classification Search
CPC ...... F16M 13/027; E04B 9/006; H02G 3/281; F21V 21/043; F21S 8/026; F21S 8/04
See application file for complete search history.

(56) References Cited

U.S. PATENT DOCUMENTS

| | | | | |
|---|---|---|---|---|
| 10,728,639 | B1 * | 7/2020 | Chang | F16M 13/027 |
| 2010/0252703 | A1 | 10/2010 | Wright | |
| 2012/0281410 | A1 * | 11/2012 | Wong | F21V 21/043<br>362/249.02 |
| 2018/0112703 | A1 * | 4/2018 | Meyer, Jr. | F16B 31/021 |

OTHER PUBLICATIONS

Written Opinion of the International Searching Authority, for PCT/US2020/043953, Prepared by the European Patent Office, dated Nov. 12, 2020, 8 pages.
International Search Report for PCT/US2020/043953, Prepared by the European Patent Office, dated Nov. 12, 2020, 3 pages.

* cited by examiner

MOUNTING SYSTEM FOR A LOUDSPEAKER

CROSS-REFERENCE TO RELATED APPLICATIONS

This application is the U.S. national phase of PCT Application No. PCT/US2020/043953 filed on Jul. 29, 2020, which claims the benefit of U.S. provisional application Ser. No. 62/879,743 filed Jul. 29, 2019, the disclosures of which are hereby incorporated in their entirety by reference herein.

TECHNICAL FIELD

Embodiments relate to a mounting system for mountable in-ceiling and in-wall loudspeakers.

BACKGROUND

Mounting loudspeakers in walls and ceilings presents a number of challenges relating to maintaining the strength and stability of the loudspeaker during and after installation. Ceiling speaker installation may be particularly difficult, since the forces of gravity are constantly pulling the loudspeaker away from the mounting surface, and the loudspeaker may not be supported by a surface other than its fastening interface.

In order to provide support for ceiling- or wall-mounted loudspeakers, a general class of devices called “dog legs” may be used. Dog leg mounting or retention systems are configured to clamp, or dog, a peripheral portion of a wall or ceiling surface, such as drywall or wood, between the dog leg and a flange of the loudspeaker frame. Generally, two or more dog legs are provided peripherally around the loudspeaker or other device, such that the device may be secured to the wall or ceiling by the gripping force of the dog legs.

In conventional operation, a screw or similar device is used to rotate the dog legs such that the dog legs are moved away from a resting position adjacent the loudspeaker frame and toward an internal surface of a wall or ceiling mounting surface. However, during installation, current dog leg technology requires the installer to hold the loudspeaker in place with one hand and use a tool with the other hand to turn the dog legs one by one into the working position to engage the internal wall surface and properly hold the loudspeaker in the wall or ceiling cutout. When the dog leg is turned into working position, the screw drops along with the dog leg which may cause the loudspeaker to drop out of the cutout. Therefore, the installer is required to always keep one hand on the loudspeaker to keep the loudspeaker inside the cutout and flush against the drywall before securing it.

Furthermore, conventional dog leg mounting systems tend to be quite loose and may not provide sufficient retention of the loudspeaker within the wall or ceiling after multiple uses or reconfigurations. When the friction level between the dog leg and the screw is compromised, the dog leg may move around undesirably which may, in turn, affect the stability and/or the position of the mounted loudspeaker.

When the loudspeaker is to be removed, the dog leg may be moved away from the mounting surface and into the resting position wherein the dog leg does not protrude outward from the loudspeaker periphery. This resting position may be maintained while a force is applied to the dog leg, such as a force of unscrewing the dog leg. However, once the force is no longer present, the dog leg may move out of the resting position and into a position that may result in complicating the removal of the mounted loudspeaker. In some cases, a user may have to remove a portion of the wall or ceiling in order to remove the loudspeaker when the dog leg is stuck in an obstructing position.

SUMMARY

In one or more embodiments, a mounting system for a loudspeaker includes a mounting assembly having an elongated screw, a support member received on and movable along the screw, and a mounting arm rotatably connected to the support member, the mounting arm having a resting position and a working position. The mounting assembly further includes a guide housing which receives the mounting assembly with the screw extending longitudinally therethrough, the guide housing including a wall structure with an open front side and a cap at a top portion of the wall structure. In the resting position, the support member is positioned along the screw to be at least partially received within the cap and the mounting arm is substantially contained within the wall structure. In the working position, the support member is positioned along the screw to be outside of the cap and the mounting arm is spring-biased away from the screw and extends outwardly through the front side of the wall structure.

In one or more embodiments, a loudspeaker includes a frame and at least one mounting system coupled to the frame. The at least one mounting system includes an elongated screw, a support member received on and movable along the screw, and a mounting arm rotatably connected to the support member, the mounting arm having a resting position and a working position. The at least one mounting system further includes a guide housing which receives the mounting assembly with the screw extending longitudinally therethrough, the guide housing including a wall structure with an open front side and a cap at a top portion of the wall structure. In the resting position, the support member is positioned along the screw to be at least partially received within the cap and the mounting arm is substantially contained within the wall structure. In the working position the support member is positioned along the screw to be outside of the cap and the mounting arm is spring-biased away from the screw and extends outwardly through the front side of the wall structure.

In one or more embodiments, the loudspeaker has a plurality of mounting systems coupled to the frame and spaced around a periphery of the loudspeaker.

In one or more embodiments, the mounting arm includes a front wall and opposing side walls depending from the front wall, forming a hollow interior of the mounting arm.

In one or more embodiments, a bottom end of the side walls includes an inwardly extending flange.

In one or more embodiments, the front wall includes an indentation on a proximal end thereof which is arranged to receive the support member when the mounting arm is in the working position.

In one or more embodiments, in the working position, the mounting arm is oriented generally perpendicular to the screw with the support member abutting the mounting arm at the indentation.

In one or more embodiments, the support member includes projections, and an interior surface of the wall structure includes opposed longitudinal slots which are arranged to receive the projections such that as the screw rotates, the support member translates longitudinally along the screw and is prevented from rotating.

In one or more embodiments, a bottom end of the support member includes at least one tab extending outwardly therefrom, wherein the guide housing includes a bottom surface which limits translation of the support member along the screw via engagement with the tab.

In one or more embodiments, the screw is fastened to the cap by a nut to secure the mounting assembly to the guide housing.

In one or more embodiments, a method of mounting a loudspeaker to a substrate includes providing at least one mounting system coupled to a frame of the loudspeaker. The at least one mounting system includes a mounting assembly including an elongated screw, a support member received on and movable along the screw, and a mounting arm rotatably connected to the support member, the mounting arm having a resting position and a working position. The at least one mounting system further includes a guide housing which receives the mounting assembly with the screw extending longitudinally therethrough, the guide housing including a wall structure with an open front side and a cap at a top portion of the wall structure. The method further includes inserting the loudspeaker in an aperture of the substrate such that the mounting arm is arranged above an interior surface of the substrate. The method further includes placing the mounting arm in the working position by rotating the screw in a first direction to position the support member outside of the cap, such that the mounting arm is spring-biased away from the screw and extends outwardly through the front side of the wall structure and is situated to contact the interior surface of the substrate.

In one or more embodiments, placing the mounting arm in the working position occurs prior to inserting the loudspeaker in the aperture.

In one or more embodiments, the method further includes placing the mounting arm in the resting position by rotating the screw in a second direction to position the support member at least partially within the cap, such that the mounting arm is substantially contained within the wall structure for removing the loudspeaker from the aperture.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
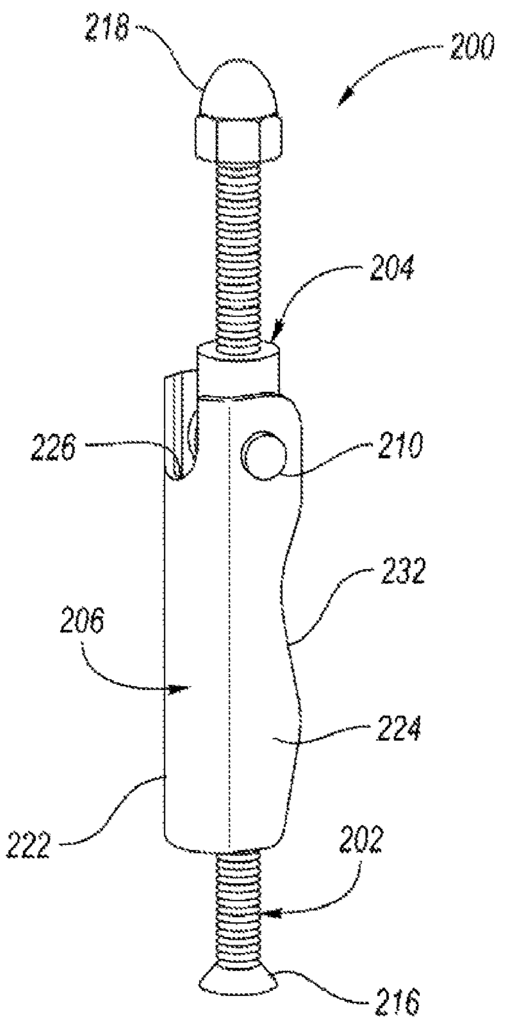
FIG. 1 is a perspective view of a mounting assembly according to one or more embodiments, where a mounting arm is shown in a resting position.
Figure 2:
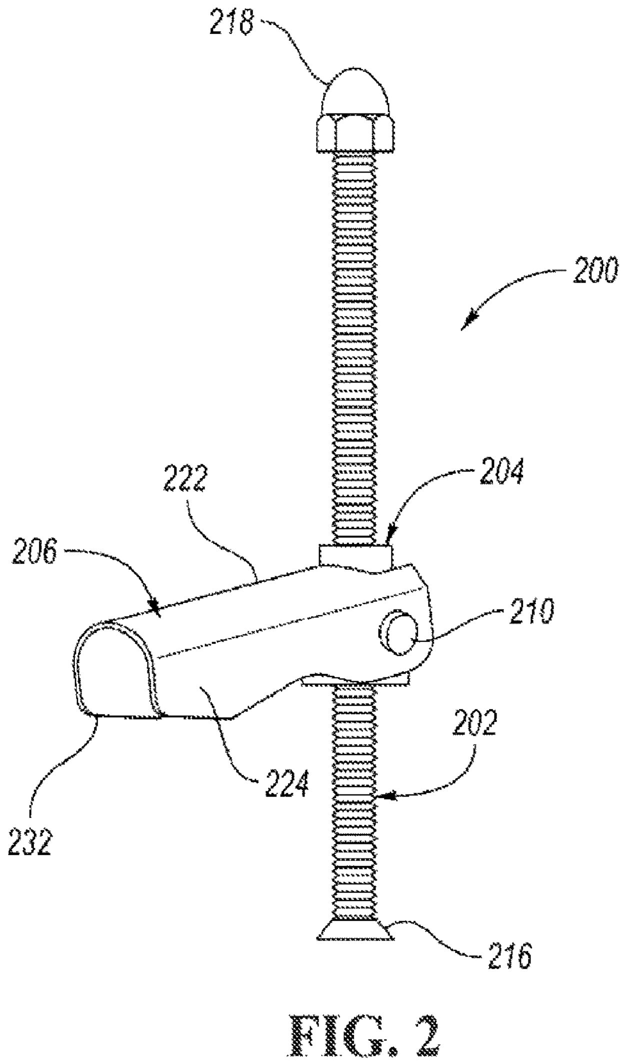
FIG. 2 is a perspective view of the mounting assembly with the mounting arm shown in a working position.
Figure 3:
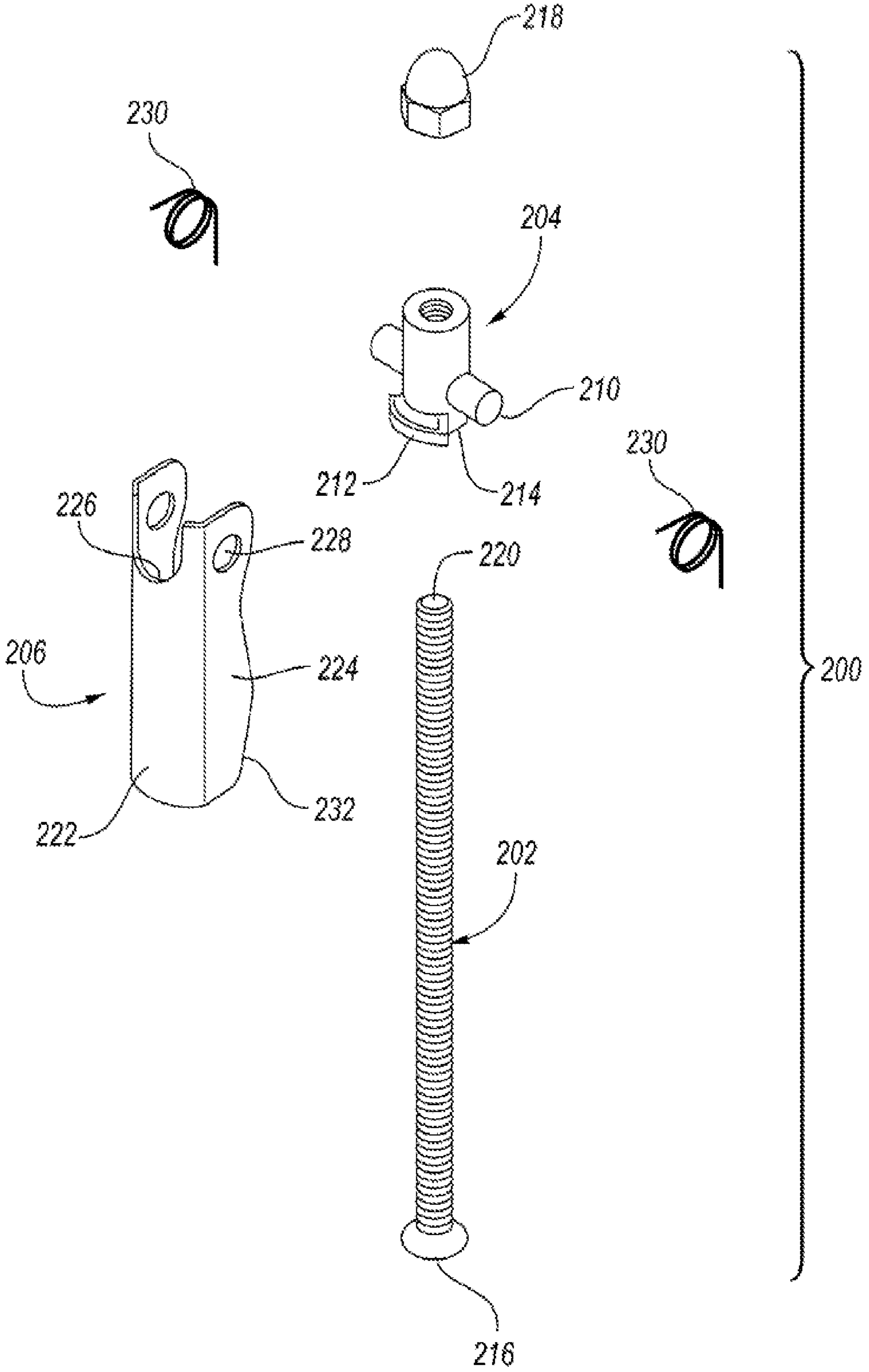
FIG. 3 is an exploded view of the mounting assembly according to one or more embodiments.

According to one or more embodiments, and with reference to the drawings, a mounting system 100 which includes a mounting assembly 200 and a guide housing 300 for mounting a loudspeaker 400 to a substrate 500. With reference first to FIGS. 1-3, the mounting assembly 200 is illustrated and includes an elongated screw 202, a support member 204 received on the screw 202, and a mounting arm 206 rotatably connected to the support member 204. FIG. 1 illustrates the mounting arm 206 in a resting position, FIG. 2 illustrates the mounting arm 206 in a working position, and FIG. 3 shows an exploded view of the components of the mounting assembly 200.

The support member 204 may be generally cylindrical and is internally threaded so that it is movable along the screw 202 as the screw 202 rotates. The support member 204 includes projections 210 or nubbins extending from either side thereof, wherein the projections 210 are approximately 180 degrees opposed from each other. The projections 210 may be generally cylindrical as shown, but are not limited to this shape. The support member 204 may also include at least one tab 212 extending outwardly near a bottom end 214 thereof, wherein the tab 212 may act as a stop to limit travel of the support member 204 along the screw 202 downward in the direction of the screw head 216. A nut 218 is received on the screw end 220 and cooperates with the guide housing 300 to limit the travel of the support member 204 along the screw 202 upward in the direction of the screw end 220 as described further below.

In one or more embodiments, the mounting arm 206 may include a front wall 222 and opposing side walls 224 depending from the front wall 222, forming a hollow interior of the mounting arm 206. The front wall 222 may include an indentation 226 on a proximal end thereof which is sized to receive the support member body 208 when the mounting arm 206 is rotated into a working position, as described further below. The side walls 224 each include an aperture 228 arranged to receive one of the projections 210 on the support member 204 for rotatably connecting the mounting arm 206 to the support member 204. Springs 230 are provided on the projections 210 which function to bias the mounting arm 206 outward away from the screw into a working position. In one or more embodiments, the working position may include the mounting arm 206 oriented generally perpendicular to the screw 202, limited by abutment of the indentation 226 with the support member body 208. Of course, the working position is not limited to a perpendicular orientation between the mounting arm 206 and the screw 202, and other outward positions of the mounting arm 206 are also contemplated.

Figure 10:
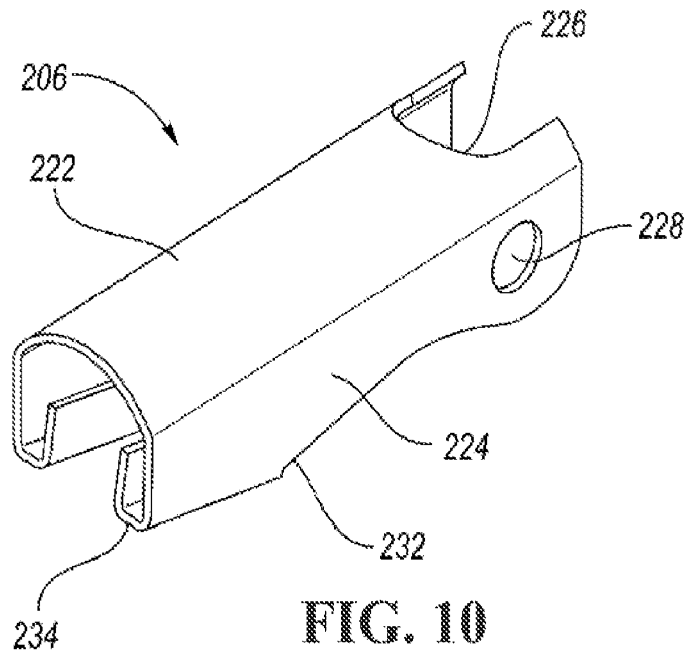
FIG. 10 is a perspective view of an alternative mounting arm according to one or more embodiments.
Figure 11:
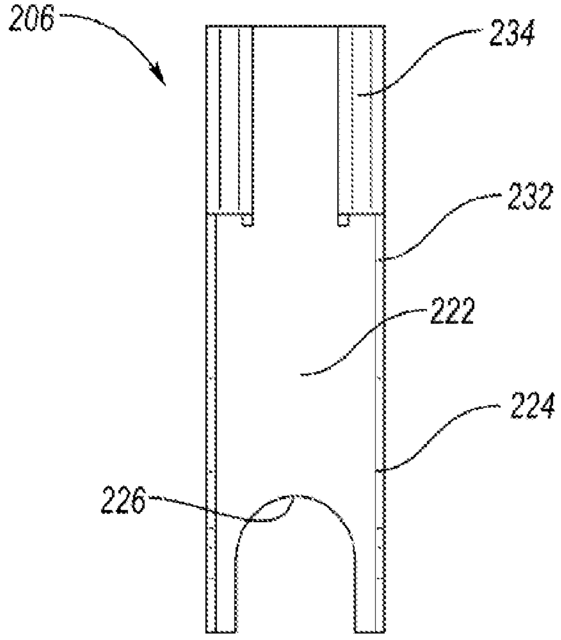
FIG. 11 is a bottom view of the mounting arm of FIG. 10.

On the mounting arm 206, the bottom ends 232 of the side walls 224 can have any configuration suitable for engaging the substrate 500 for mounting the loudspeaker 400. In one or more embodiments, the bottom ends 232 can be contoured as shown in FIGS. 1-3, or in other embodiments the bottom ends 232 could include an inwardly extending flange 234 to provide greater load distribution as illustrated in FIGS. 10-11. It is understood that the mounting arm 206 is not limited to the configurations shown and described herein, and that other shapes and sizes are fully contemplated. The mounting arm 206 may be constructed from a metallic material, or alternatively may be constructed from a rigid plastic material or other material having the requisite strength and durability for the loudspeaker mounting application described herein.

Figure 4:
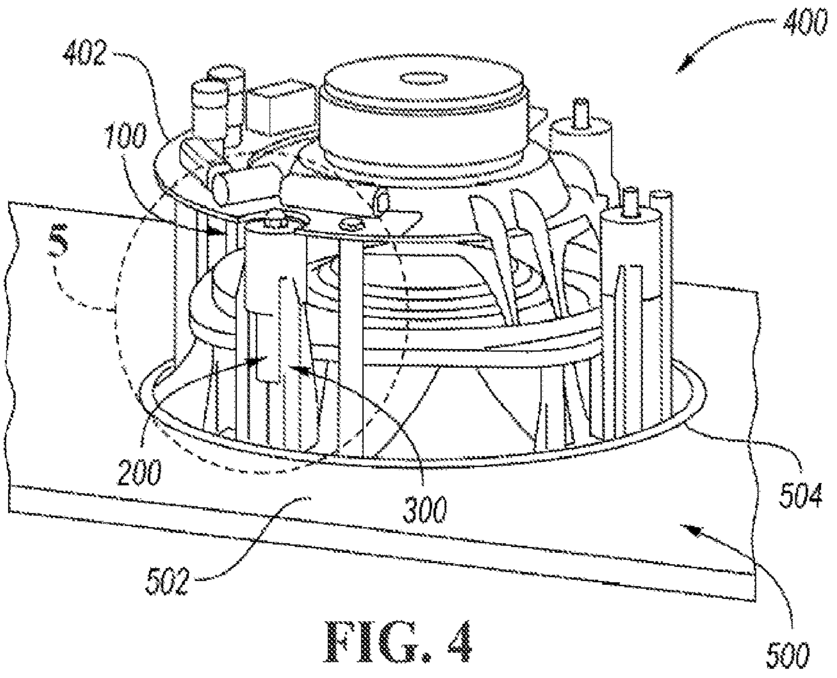
FIG. 4 is a perspective view of a loudspeaker which includes a mounting system according to one or more embodiments, the mounting system including a guide housing which receives the mounting assembly, wherein the mounting arm is shown in a resting position.
Figure 5:
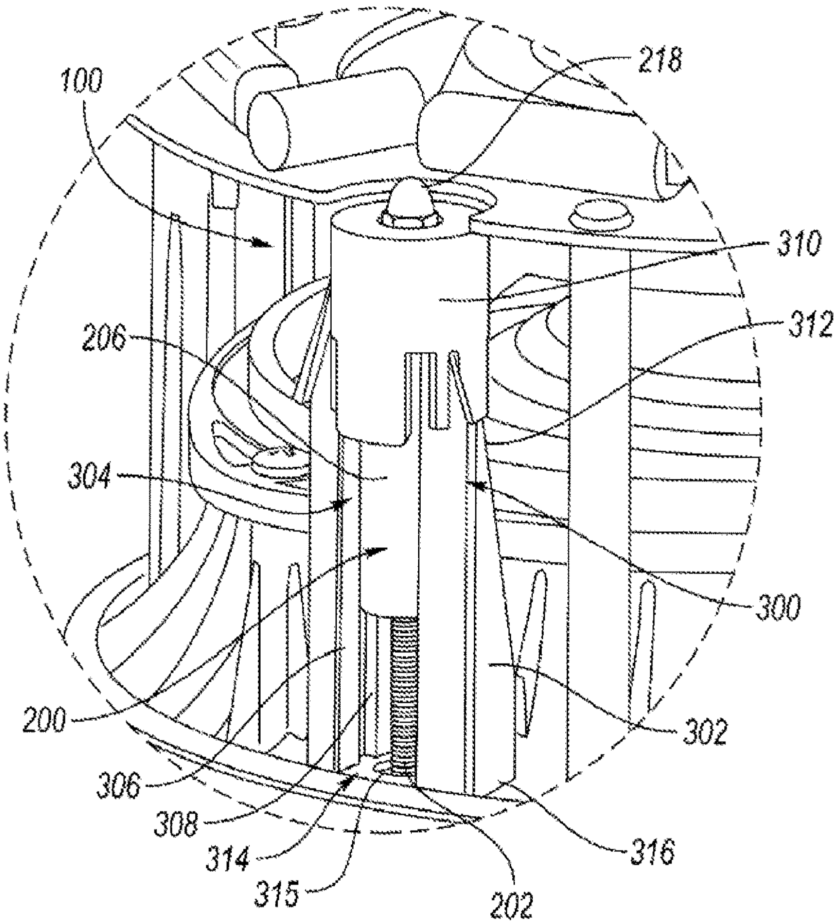
FIG. 5 is an enlarged, perspective view of the mounting system with the mounting arm in a resting position.
Figure 9:
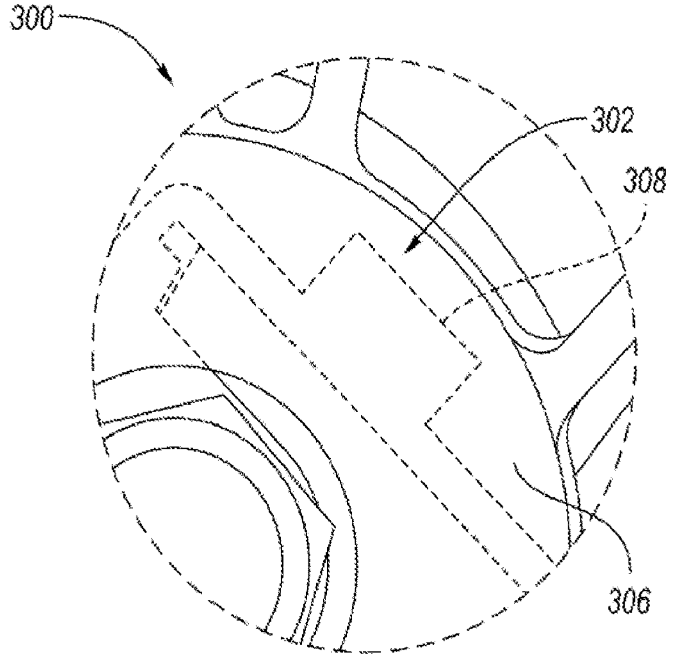
FIG. 9 is an enlarged bottom view of the mounting system illustrating a longitudinal slot along an interior of the guide housing.

Turning now to FIGS. 4 and 5, a loudspeaker 400 having a body or frame 402 is depicted, wherein the mounting system 100 is coupled to or integrally formed with the frame 402. The mounting system 100 includes a guide housing 300 which receives the mounting assembly 200 described above. The guide housing 300 includes a wall structure 302 with an open front side 304 through which the mounting arm 206 can extend, wherein the screw 202 extends longitudinally within the wall structure 302. An interior surface 306 of the wall structure 302 includes opposed longitudinal slots 308 which are arranged to receive the projections 210 of the support member 204, wherein a bottom view of one longitudinal slot 308 is illustrated in FIG. 9. With the projections 210 received in the slots 308, the support member 204 and its connected mounting arm 206 are prevented from rotating as the screw 202 is turned, and instead the support member 204 translates up and down the screw 202.

In one or more embodiments, the guide housing 300 further includes a generally cylindrical cap 310 disposed over a top portion 312 of the wall structure 302. The screw end 220 extends through an aperture (not shown) in the cap 310 and the nut 218 is secured to the screw 202 and abuts the cap 310, thereby securing the mounting assembly 200 to the guide housing 300. The guide housing 300 may include a rubber grommet or bottom surface 314 having an aperture 315 through which the screw 202 is inserted, wherein the screw head 216 abuts an underside of the bottom surface 314. The bottom surface 314 may also act to limit the travel of the support member 204, such as via engagement with the tab 212. The guide housing 300 may be constructed from plastic or another suitable material.

Figure 6:
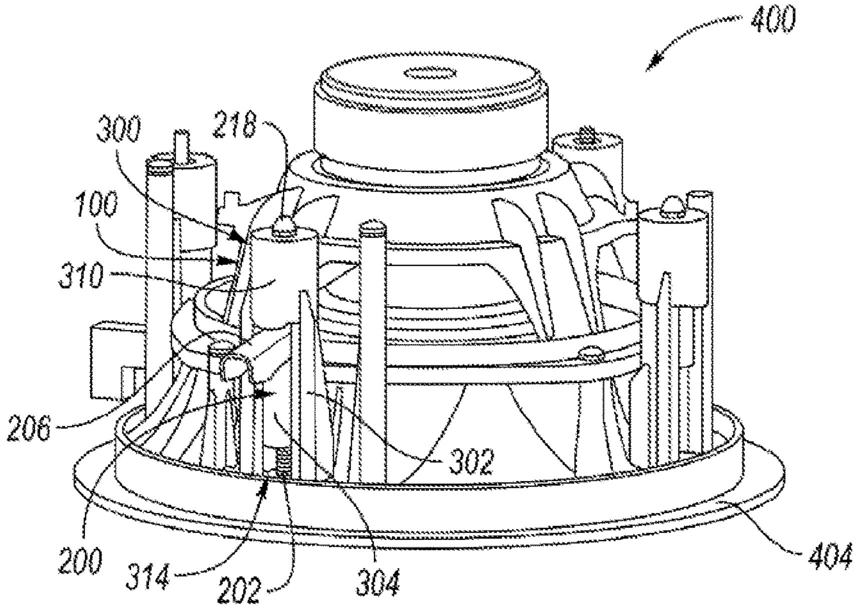
FIG. 6 is a perspective view of a loudspeaker and included mounting system with the mounting arm in a working position.
Figure 7:
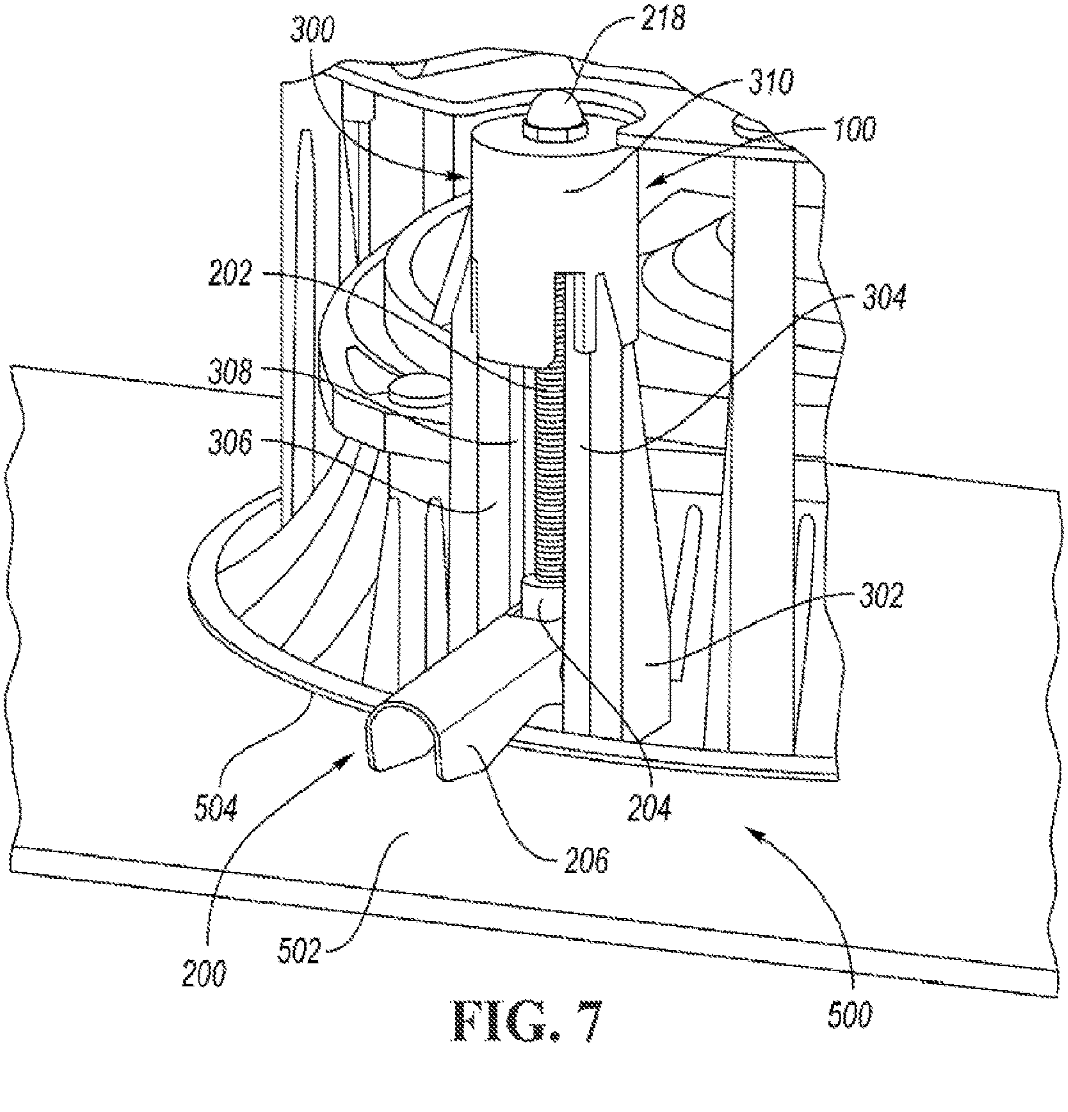
FIG. 7 is an enlarged, perspective view of the mounting system with the mounting arm in another working position engaging a substrate.

In the resting position shown in FIGS. 4 and 5, the support member 204 is received within the cap 310 of the guide housing 300 and the mounting arm 206 is thus collapsed inward generally parallel to the screw 202 and contained within the wall structure 302. When the screw 202 is rotated in a first direction (e.g. counterclockwise), the support member 204 translates downward along the screw 202 toward the screw head 216 until the mounting arm 206 is positioned downward from and outside of the cap 310. When this occurs, the mounting arm is released into a working position as illustrated in FIG. 6, where the springs 230 bias the mounting arm 206 outward into an orientation approximately 90 degrees from the screw 202. As the screw 202 is rotated further in the same direction, the support member 204 continues to travel downward along the screw 202 until the bottom ends 232 of the side walls 224 of the mounting arm 206 engage an interior surface 502 of the substrate 500, as shown in FIG. 7. The clamping action of the mounting arm 206 will apply a reasonable mounting force to a portion of the loudspeaker 400 being mounted, such as the rear face of a loudspeaker mounting flange 404. If the screw 202 is rotated in a second, opposite direction (e.g., clockwise), the support member 204 will translate upward along the screw 202 toward the screw end 220 and eventually the support member 204 and mounting arm 206 will once again be at least partially received within the cap 310 and the mounting arm 206 will be collapsed into the resting position.

Figure 8:
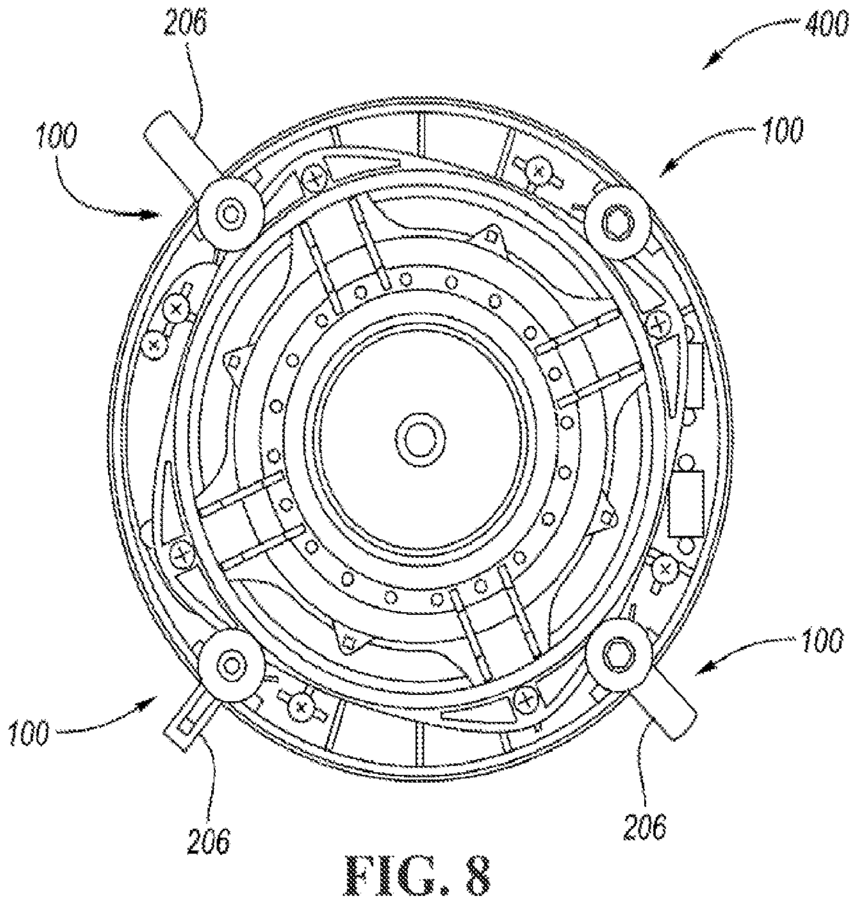
FIG. 8 is a bottom view of a loudspeaker which includes a plurality of mounting systems according to one or more embodiments.

FIG. 8 is a bottom view of the loudspeaker 400 having a plurality of mounting systems 100 included around the periphery thereof, with three mounting arms 206 shown in the working position and extending approximately perpendicularly from the axis of the screw 202 and the guide housing 300. Of course, the loudspeaker 400 is not limited to four equally spaced mounting systems 100, but alternatively could have two diametrically opposed mounting systems 100, or three, or more than four mounting systems 100 spaced around the periphery.

In prior art mounting devices, the dog legs must be in the resting position in order to insert the loudspeaker into the cutout in the wall or ceiling. Advantageously, installation of a loudspeaker with the mounting system 100 disclosed herein can be accomplished with the mounting arms 206 already in the working position. During the process of inserting the loudspeaker 400 into the cutout (aperture 504) of the wall or ceiling (substrate 500) with the mounting arms 206 in the working position, the substrate 500 contacts the mounting arms 206 as they extend generally perpendicularly from the axis of the guide housing 300. Due to the spring mounting of the mounting arms 206 to the support member 204, engagement of the mounting arms 206 with the substrate 500 causes the mounting arms 206 to collapse toward the screw 202, allowing the loudspeaker 400 to be inserted into the cutout. Once the mounting arms 206 pass through the aperture 504, the spring-biased mounting arms 206 resiliently unfold into the working position, allowing the loudspeaker 400 to be suspended by the mounting arms 206 without requiring the installer to support the loudspeaker 400 within the wall or ceiling.

As such, loudspeakers with the mounting system 100 described herein can be installed into cutouts and remain in position with respect to the substrate 500 even before the loudspeaker 400 is secured via fasteners, without requiring an installer to support the loudspeaker 400 before or during fastening. This allows an installer to place several loudspeakers 400 in position as a first step and then fasten all of the loudspeakers 400 as a second step, resulting in a more efficient installation process. The mounting system 100 also allows an installer to check for an acceptable electrical signal from each loudspeaker 400 once it is retained in the wall or ceiling by the mounting arms 206 prior to having to secure the loudspeaker 400 in the substrate 500 with fasteners, thus avoiding possibly having to remove fasteners for troubleshooting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mounting system for a loudspeaker, the mounting system comprising:

a mounting assembly including an elongated screw, a support member received on and movable along the screw, and a mounting arm rotatably connected to the support member, the mounting arm having a resting position and a working position, wherein a bottom end of the support member includes at least one tab extending outwardly therefrom; and a guide housing which receives the mounting assembly with the screw extending longitudinally therethrough, the guide housing including a wall structure with an open front side and a cap at a top portion of the wall structure, wherein the guide housing includes a bottom surface which limits translation of the support member along the screw via engagement with the tab, wherein in the resting position the support member is positioned along the screw to be at least partially received within the cap, and in the working position the support member is positioned along the screw to be outside of the cap and the mounting arm is spring-biased away from the screw and extends outwardly through the front side of the wall structure.

2. The mounting system of claim 1, wherein the mounting arm includes a front wall and opposing side walls depending from the front wall, forming a hollow interior of the mounting arm.

3. The mounting system of claim 2, wherein a bottom end of the side walls includes an inwardly extending flange.

4. The mounting system of claim 2, wherein the front wall includes an indentation on a proximal end thereof which is arranged to receive the support member when the mounting arm is in the working position.

5. The mounting system of claim 4, wherein in the working position, the mounting arm is oriented generally perpendicular to the screw with the support member abutting the mounting arm at the indentation.

6. The mounting system of claim 1, wherein the support member includes projections, and an interior surface of the wall structure includes opposed longitudinal slots which are arranged to receive the projections such that as the screw rotates, the support member translates longitudinally along the screw and is prevented from rotating.

7. The mounting system of claim 1, wherein the screw is fastened to the cap by a nut to secure the mounting assembly to the guide housing.

8. The mounting system of claim 1, wherein in the resting position, the mounting arm is contained within the wall structure.

9. A loudspeaker, comprising:

a frame;

at least one mounting system coupled to the frame, the at least one mounting system including a mounting assembly including an elongated screw, a support member received on and movable along the screw, and a mounting arm rotatably connected to the support member, the mounting arm having a resting position and a working position, a bottom end of the support member including at least one tab extending outwardly therefrom; and a guide housing which receives the mounting assembly with the screw extending longitudinally therethrough, the guide housing including a wall structure with an open front side and a cap at a top portion of the wall structure, the guide housing including a bottom surface which limits translation of the support member along the screw via engagement with the tab, wherein in the resting position the support member is positioned along the screw to be at least partially received within the cap, and in the working position the support member is positioned along the screw to be outside of the cap and the mounting arm is spring-biased away from the screw and extends outwardly through the front side of the wall structure.

10. The loudspeaker of claim 9, wherein the loudspeaker has a plurality of mounting systems coupled to the frame and spaced around a periphery of the loudspeaker.

11. The loudspeaker of claim 9, wherein the mounting arm includes a front wall and opposing side walls depending from the front wall, forming a hollow interior of the mounting arm.

12. The loudspeaker of claim 11, wherein a bottom end of the side walls includes an inwardly extending flange.

13. The loudspeaker of claim 11, wherein the front wall includes an indentation on a proximal end thereof which is arranged to receive the support member when the mounting arm is in the working position.

14. The loudspeaker of claim 13, wherein in the working position, the mounting arm is oriented generally perpendicular to the screw with the support member abutting the mounting arm at the indentation.

15. The loudspeaker of claim 9, wherein the support member includes projections, and an interior surface of the wall structure includes opposed longitudinal slots which are arranged to receive the projections such that as the screw rotates, the support member translates longitudinally along the screw and is prevented from rotating.

16. The loudspeaker of claim 9, wherein the screw is fastened to the cap by a nut to secure the mounting assembly to the guide housing.

17. The loudspeaker of claim 9, wherein in the resting position, the mounting arm is contained within the wall structure.

18. A method of mounting a loudspeaker to a substrate, the method comprising:

providing at least one mounting system coupled to a frame of the loudspeaker, the at least one mounting system including a mounting assembly including an elongated screw, a support member received on and movable along the screw, and a mounting arm rotatably connected to the support member, the mounting arm having a resting position and a working position, a bottom end of the support member including at least one tab extending outwardly therefrom; and a guide housing which receives the mounting assembly with the screw extending longitudinally therethrough, the guide housing including a wall structure with an open front side and a cap at a top portion of the wall structure, the guide housing including a bottom surface which limits translation of the support member along the screw via engagement with the tab;

inserting the loudspeaker in an aperture of the substrate such that the mounting arm is arranged above an interior surface of the substrate; and placing the mounting arm in the working position by rotating the screw in a first direction to position the support member outside of the cap, such that the mounting arm is spring-biased away from the screw and extends outwardly through the front side of the wall structure and is situated to contact the interior surface of the substrate.

19. The method of claim 18, wherein placing the mounting arm in the working position occurs prior to inserting the loudspeaker in the aperture.

20. The method of claim 18, further comprising placing the mounting arm in the resting position by rotating the screw in a second direction to position the support member at least partially within the cap, such that the mounting arm is contained within the wall structure for removing the loudspeaker from the aperture.

* * * * *